US007004546B1

(12) United States Patent
Thisius et al.

(10) Patent No.: US 7,004,546 B1
(45) Date of Patent: Feb. 28, 2006

(54) STOWABLE CHAIR ARMREST

(75) Inventors: Todd A. Thisius, Cheney, KS (US); Arthur E. Chapman, II, Wichita, KS (US); Timothy J. O'Connell, Towanda, KS (US); Craig D. Cillessen, Wichita, KS (US); Christopher A. Pinkerton, Derby, KS (US)

(73) Assignee: Cessna Aircraft Company, Wichita, KS (US)

( * ) Notice: Subject to any disclaimer, the term of this patent is extended or adjusted under 35 U.S.C. 154(b) by 0 days.

(21) Appl. No.: 11/112,014

(22) Filed: Mar. 30, 2005

(51) Int. Cl.
*A47C 7/54* (2006.01)

(52) U.S. Cl. .............................. 297/411.33; 297/411.34; 297/411.32; 403/56; 403/112; 403/113

(58) Field of Classification Search ............. 297/411.3, 297/411.33 OR, 411.34, 411.32; 403/56, 403/112, 113, 114, 76, 122–144
See application file for complete search history.

(56) References Cited

U.S. PATENT DOCUMENTS

| | | | |
|---|---|---|---|
| 1,399,744 A * | 12/1921 | Brophy .................. 297/411.33 |
| 2,844,193 A * | 7/1958 | Lauterbach .................. 297/116 |
| 2,980,170 A * | 4/1961 | Bechtold ................ 297/411.34 |
| 2,985,226 A * | 5/1961 | Maurer et al. .............. 297/359 |
| 3,261,641 A * | 7/1966 | Black et al. ................. 297/162 |

* cited by examiner

*Primary Examiner*—Laurie K. Cranmer
(74) *Attorney, Agent, or Firm*—Edward L. Brown, Jr.

(57) ABSTRACT

A stowable chair armrest for a seat assembly which includes a armrest portion connected to the seat assembly through a restricted movement rotating joint which has limited rotation about a horizontal X and Y axes, the Y-axis being parallel to the length of the armrest portion and positioned above the plane of the seat cushion whereby the armrest portion is rotatable about the Y-axis approximately 180° from an elevated position of the armrest to a retracted position. When the armrest is in its use position, it cannot rotate downward about its Y-axis. However, the arm rest can be lifted upward 10° about its X-axis, wherein a flat blade connecting the armrest to a spherical pivot becomes aligned in a longitudinal chamber having a circular cross-section thus permitting the armrest portion to rotate 180° about its Y-axis to its stowed position.

4 Claims, 3 Drawing Sheets

STOWABLE CHAIR ARMREST

BACKGROUND OF THE INVENTION

The present invention relates broadly to a stowable armrest and more specifically to a vehicle seat having an armrest that can be folded away to a retracted storage position.

All types of vehicles for many years have utilized stowable arm supports such as farm tractors, digging machinery, automobiles, trucks, and aircraft. Having vehicles with flexibility with regard to the interior space is currently a favored characteristic of vehicles such as mini vans and SUVs. The trend toward smaller vehicles with wider seats compounds the lateral space problem within vehicles with the areas occupied by armrests being critical.

Typical armrests in vehicles rotate about a lateral horizontal axis whereby the armrest folds upward into the plane of the backrest as typified in the patents to Tame U.S. Pat. No. 5,104,191 and Swenson U.S. Pat. No. 3,612,606.

In other configurations the armrest rotates about the same lateral horizontal axis with a second axis of rotation about a longitudinal horizontal axis whereby the armrest can be folded behind the seat back as taught in Krein U.S. Pat. No. 3,550,958.

In the patent to Geer U.S. Pat. No. 5,290,092 an automotive armrest is rotatable about two separate axes, one being a longitudinal axis while the other axis is in the retracted position, whereby the armrest ends up behind the seat back.

In the patent to Tame U.S. Pat. No. 5,104,191 the armrest is rotated upward about the conventional lateral axis, then the armrest portion itself is rotated about a longitudinal axis whereby the armrest is turned on its side so a to have lesser depth in lateral spacing.

SUMMARY OF THE PRESENT INVENTION

The present invention provides a stowable chair arm assembly having a restricted movement rotating joint connecting the armrest portion to the support frame of the seat assembly and through said joint connecting the armrest to the seat assembly. The rotating joint has two separate axes of rotation. The first Y-axis being longitudinal to the seat assembly allowing the connecting arm to rotate through approximately 180° from its extended locked position to a retracted or stored position of the armrest below the plane of the seat cushion. The second X-axis of rotation of the joint has two positions; the first position being the locking position preventing any rotation about the first axis of the armrest and a second unlocked position permitting the armrest to rotate about the first axis from its extended position to its retracted or stored position under the seat cushion. Both axes of rotation pass through a common spherical pivot. Connected to this spherical pivot and passing through it is a flat-sided longitudinal blade having arcuate surfaces on the top and bottom of the blade, which has a common center of rotation with the spherical pivot. The spherical pivot is supported in a spherical cavity in the base of the armrest. The spherical cavity is intersected by two longitudinal cavities both intersecting the center of the spherical pivot. The first of said longitudinal cavities is circular in cross-section and permits the flat-sided blade to rotate axially therein. The second longitudinal cavity has two flat sides, which correspond to the flat sides of the blades so that when the flat-sided blade is in the flat-sided cavity, the armrest is locked from any rotation about the first Y-axis of rotation. The flat-sided longitudinal cavity is positioned at a lower angle from the horizon to the circular longitudinal cavity so that the weight of the armrest retains the armrest in a locked, non-rotating position. However, to move the armrest to its stowed position it is merely lifted upward about its second X-axis approximately 10° which places the flat-sided blade in the circular longitudinal cavity and permits the armrest to rotate 180° to its stowed condition.

DESCRIPTION OF THE PERFERRED EMBODIMENT

Figure 1:
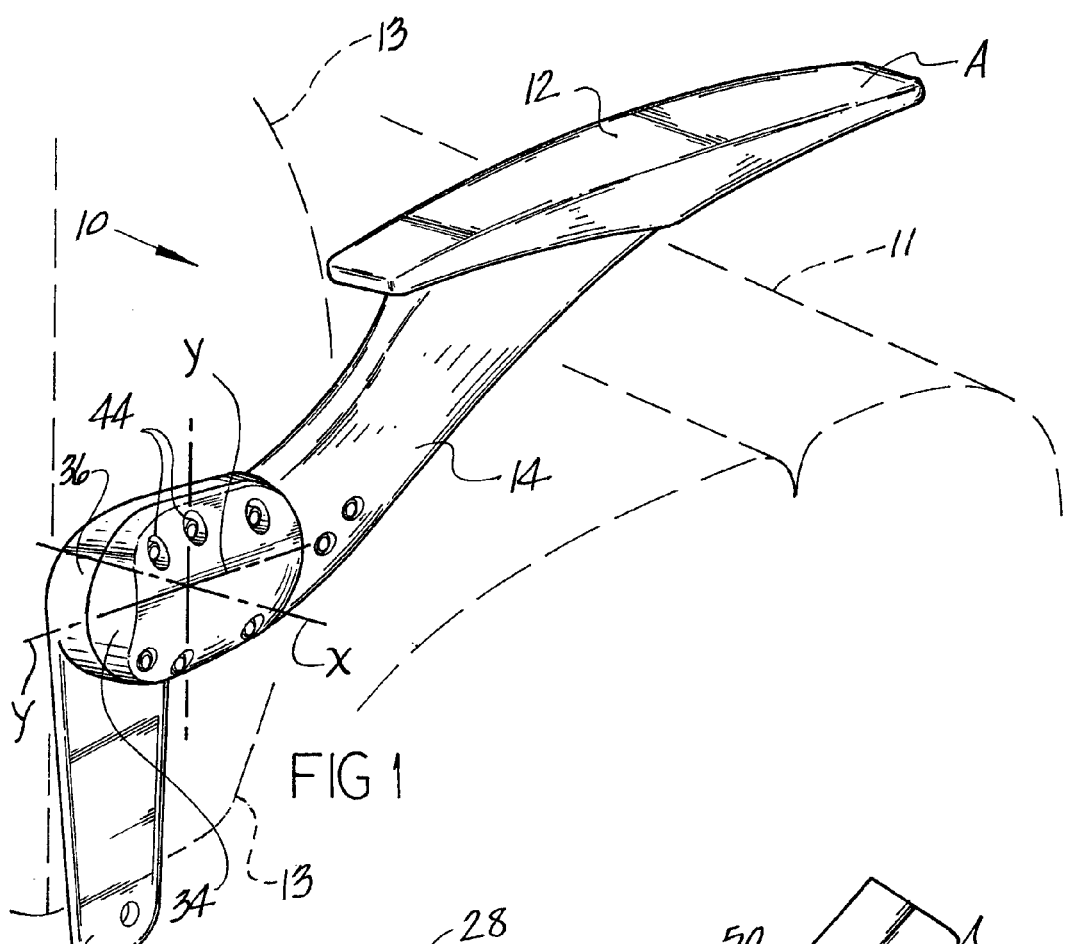
FIG. 1 is a perspective view of the foldable armrest in its elevated locked position adjacent to the back rest and seat cushion in the chair.

In FIG. 1 the stowable armrest is generally described by reference numeral 10, which is positioned to the right side of seat cushion 11 and back rest cushion 13. The frame structure, which supports the cushion and seat back, can be of any type and is not shown in detail. The overall armrest structure 10 is attached to the seat frame through arm 15. The stowable chair armrest 10 comprises an armrest portion 12 connected to a rotating joint 19 through connecting arm 14. The rotating joint 19 is in turn connected to the seat assembly through a mounting arm 15. The rotating joint 19 is shown in detail in FIGS. 2–5 and will be described in detail hereafter.

Figure 6:
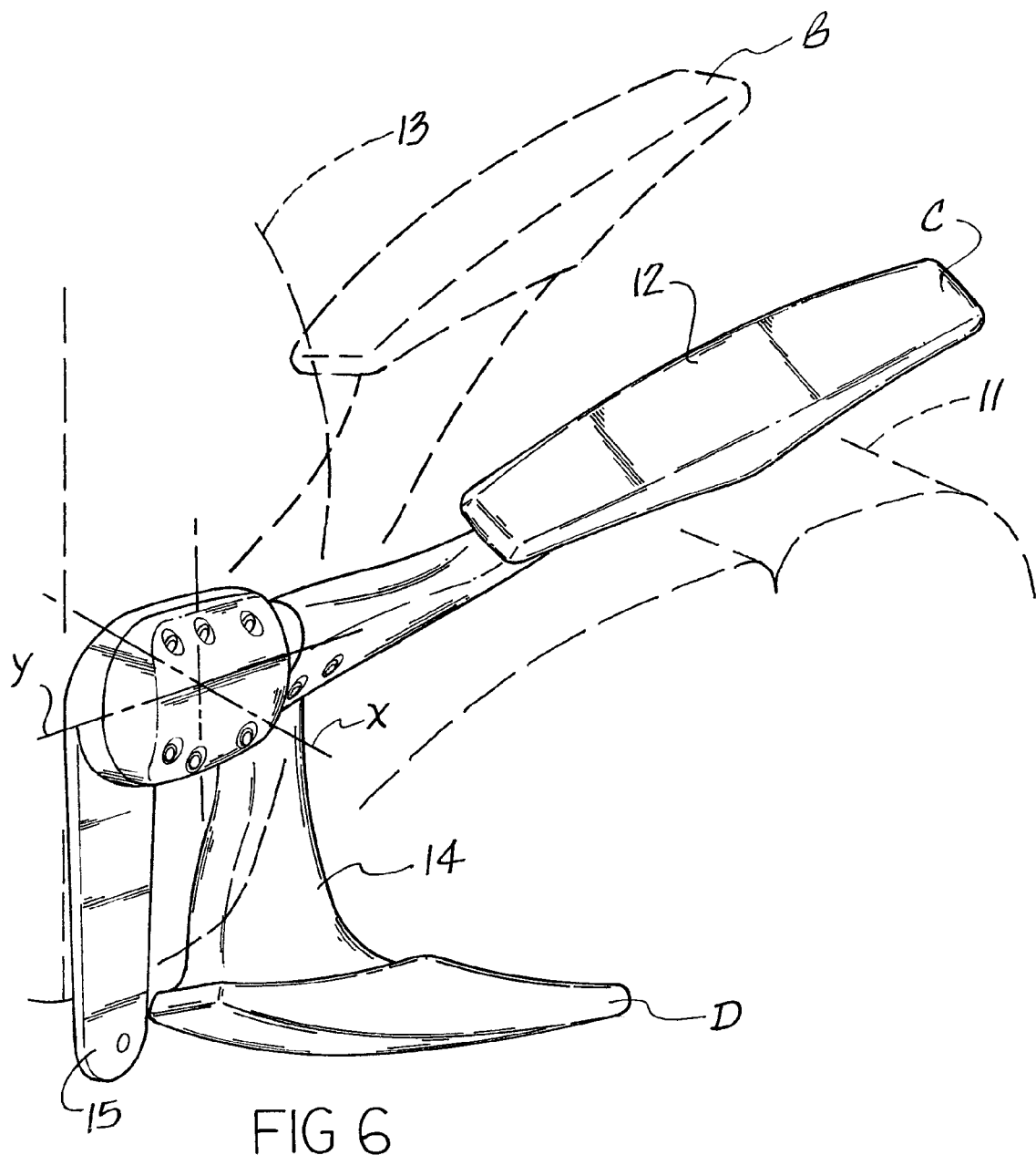
FIG. 6 is a perspective view of the stowable chair arm in the various unlocked positions of rotation about the Y-axis.

The stowable chair arm 10 is shown in its operative, locked position in position A of FIG. 1. To stow the armrest 10, it is lifted upward from its A position in FIG. 1 to its B position as shown in FIG. 6 which rotates about the X-axis approximately 10°. In this elevated B position, the rotating joint 19 is now unlocked and is free to rotate about its Y-axis through approximately 180° to its D stored position. To erect the armrest to its operative, locked position of FIG. 1 it is merely rotated from its D position about axis Y back to its FIG. 6 B position. The armrest 12 is then rotated clockwise about its X-axis approximately 10° to its locked position A shown in FIG. 1.

Figure 4:
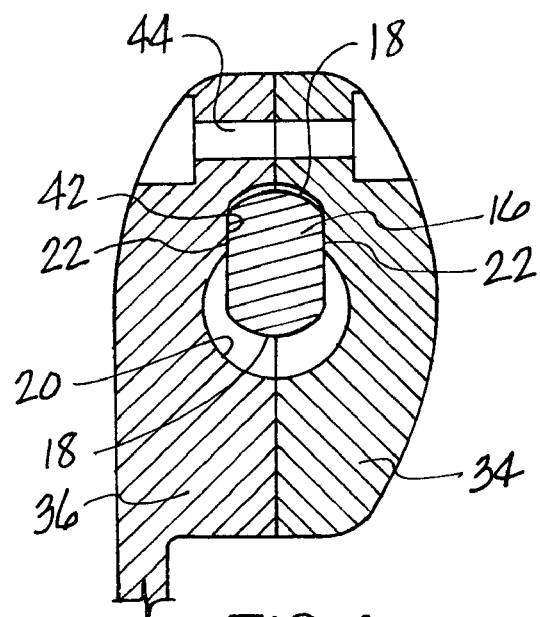
FIG. 4 is a sectional view taken along the lines 4—4 of FIG. 2.

The restricted movement rotating joint 19, as shown in FIGS. 2–5, rotates about two axes X & Y. The joint 19, shown in FIG. 2, comprises a spherical pivot 24 positioned in a spherical cavity 26, attached to the extension arm of 14 through a flat-sided blade 16. Embedded in connecting arm 14 and blade 16 is a metal arm 40 to give added strength to the blade 16 and juncture with arm 14. Both blade 16 and arm 14 are molded plastic while arm 40 is machined steel. Integral with blade 16 is a spherical pivot 24, which provides rotation of the armrest about two separate X and Y-axes noted in FIG. 1. The base structure which supports the pivot 24, is a split design of a right and left half 34 and 36 with the right half base 34 removed in FIG. 2. The two base halves 34 and 36 are held together by a series of bolts 46 positioned in bolt holes 44. The left base 36 defines a spherical cavity 26, which contains pivot 24, allowing pivot 24 to move about its X and Y-axis in a limited manner. Blade 16 passes through spherical pivot 24 with the portions of blade 16 extending from both sides of the pivot. Blade 16 includes flat side surfaces 22 as best shown in FIG. 4 with a circular top and bottom surface 18.

Figure 2:
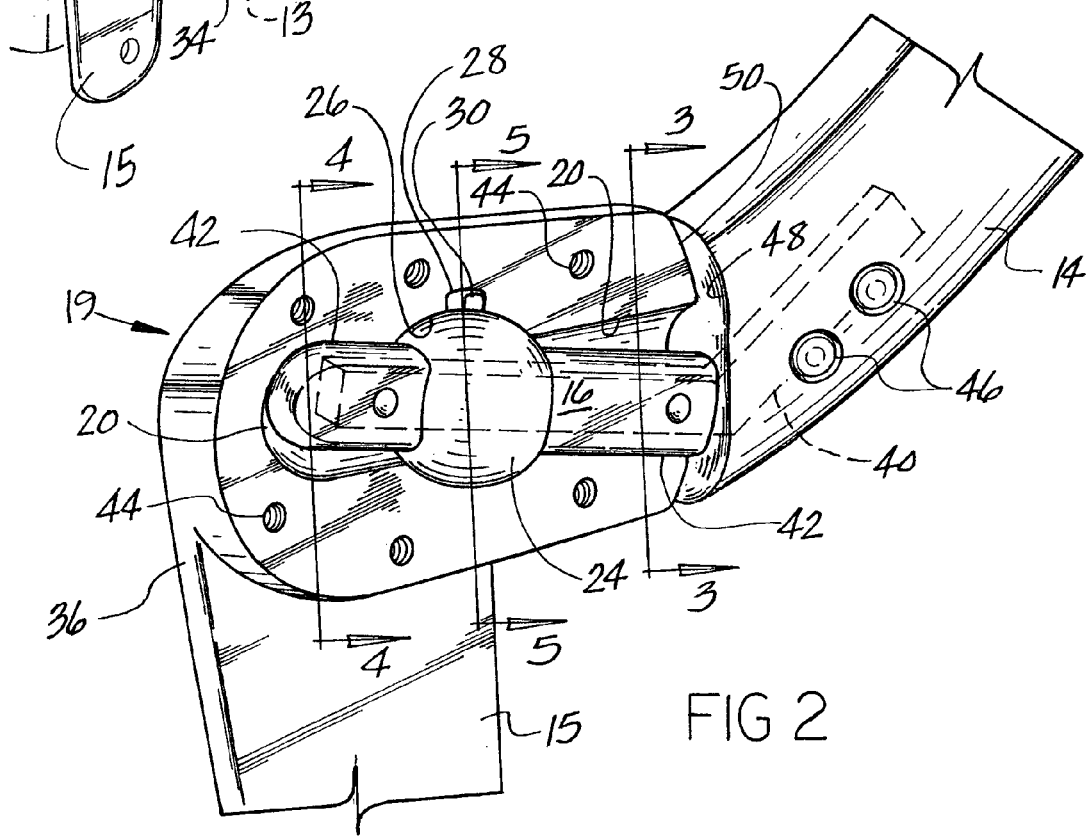
FIG. 2 is a perspective view with the right half of the rotating joint removed for better viewing.
Figure 3:
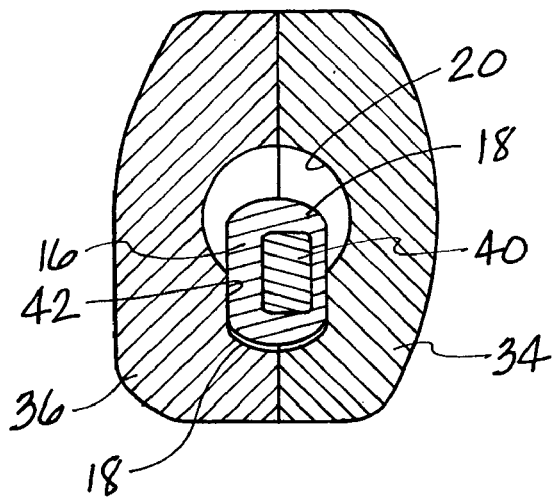
FIG. 3 is a sectional view taken along the lines 3—3 of FIG. 2.

Intersecting spherical cavity 26 are two longitudinal cavities 20 and 42, as shown in FIGS. 2, 3, and 4. Longitudinal cavity 20 is circular in cross-section as seen in FIGS. 3 and 4. Cavity 42 is flat-sided, as seen in FIGS. 3 and 4 so as to snuggly receive blade 16, which is also flat-sided. The longitudinal axis alignment of cavities 20 and 42 form an angle of approximately 10° which can be seen in FIG. 2 wherein blade 16 is in its FIG. 2 locked A position. Armrest 10 cannot rotate about its Y-axis because portions of blade 16, as shown in cross-sections in FIGS. 3 and 4, are restrained from any Y-axis rotation by reason of the flat side surfaces 22 of longitudinal cavity 42, which is the locked position of armrest 10. To unlock armrest 10 for rotation about the Y-axis, the armrest portion 12, as shown in FIG. 1, is lifted approximately 10° so that blade 16 is centered in circular cavity 20, thereby allowing rotation of the armrest 10 from its B position in FIG. 6 to its fully retracted D position or any intermediate positions. As long as flat blade 16 is located in circular cavity 20, it is free to rotate about its Y-axis, but when blade 16 is in cavity 42, it is locked against Y-axis rotation.

Figure 5:
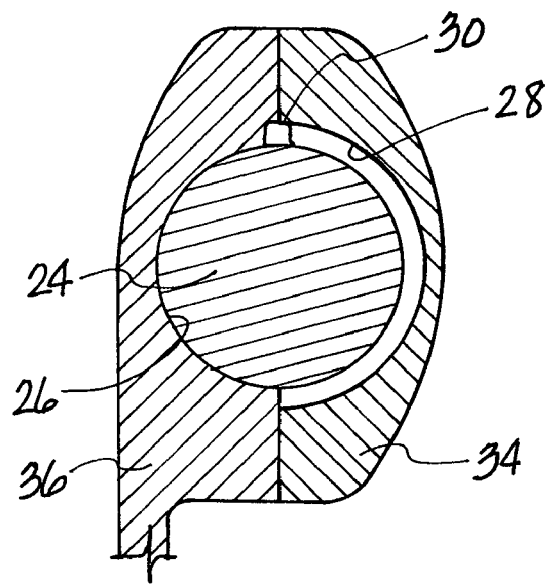
FIG. 5 is a sectional view taken along the lines 5—5 of FIG. 2.

Molded into spherical pivot 24 is a lug 30, as shown in FIGS. 2 and 5, which is contained in a semi-circular groove 28. Lug 30 restricts the armrest movement about the Y-axis to approximately 180°. The angular length of groove 28 can be varied to fit any particular seat design. With the armrest portion 12 in its B position of FIG. 6, it is free to rotate about its Y-axis.

The end surface 48 on extension arm 14 is spherical in shape with its center of rotation being concentric with pivot 24. Base halves 34 and 36 have mating spherical surfaces 50 to end surface 48.

While this invention has been described as having a preferred design, it is understood that the invention is capable of further modifications, uses, and/or adaptations which follow in general the principal of the present invention and includes such departures from the present disclosure as come within known or customary practice in the forming art and fall within the scope of the limits of the appended claims.

We claim:

1. A stowable chair armrest for a seat assembly including a seat cushion with a plane therein, a seat back, and frame supporting said cushion back, the stowable chair armrest having an extended and retracted position comprising:
   an armrest portion;
   a restricted movement rotating joint having a spherical pivot therein allowing multiple axis rotation connecting the armrest portion to the support frame of the seat assembly, the first axis of rotation of the joint being parallel to the length of the armrest portion and positioned above the plane of the seat cushion whereby the armrest portion is rotatable through approximately 180° of rotation from the extended position of the armrest to the retracted position of the armrest portion under the plane of the seat cushion.

2. A stowable chair armrest for a seat assembly as set forth in claim 1, wherein the rotating joint has a second axis of rotation laterally positioned relative to first axis and wherein the spherical pivot support a flat-sided blade which blade is connected to the armrest portion, a longitudinal cylindrical cavity in which the flat-sided blade is contained, the flat-sided blade having arcuate surfaces permitting the blade to rotate longitudinally in said cylindrical cavity.

3. A stowable chair armrest for a seat assembly having a seat cushion, a seat back and supporting frame, the stowable chair arm having an in-use extended position and a stowed position comprising:
   an armrest portion;
   a restricted movement rotating joint connecting the armrest portion to the support frame of the seat assembly, the joint having two separate intersecting axis of rotation, both axis being in a horizontal plane, with one being 90° from the other;
   the first axis being longitudinal to the seat assembly permitting the armrest to rotate through approximately 180° from the extended locked position of the armrest to the stowed position of the armrest below the plane of the seat cushion; and
   the second axis of the joint having two positions, an in-use locked position preventing any rotation of the armrest about its first axis of rotation and a second unlocked position permitting the armrest to freely rotate about its first axis.

4. A stowable chair armrest for a seat assembly as set forth in claim 3, wherein the joint includes;
   a spherical-shaped pivot positioned in a base having a spherical cavity therein;
   a flat-sided blade connected to the spherical pivot which in turn is connected to the armrest portion;
   two longitudinal cavities located in a vertical plane in said base intersecting the center of the spherical pivot, one longitudinal cavity be circular in cross-section while the other cavity is flat-sided whereby when the blade is in the circular cross-section cavity, it is free to rotate said about first axis and when it is in the flat-sided longitudinal cavity, it is locked against rotation.

* * * * *